March 17, 1953  M. W. HORRELL  2,632,103

STABILIZED PULSE CIRCUIT

Filed June 6, 1950

INVENTOR.
MAURICE W. HORRELL
BY
Ellsworth R. Roston
ATTORNEY

Patented Mar. 17, 1953

2,632,103

UNITED STATES PATENT OFFICE 2,632,103

STABILIZED PULSE CIRCUIT

Maurice W. Horrell, Detroit, Mich., assignor, by mesne assignments, to the United States of America as represented by the United States Atomic Energy Commission Application June 6, 1950, Serial No. 166,457

14 Claims. (Cl. 250—27)

This invention relates to an electrical circuit for providing stabilized output pulses and more particularly to an electrical circuit for providing stabilized output pulses having a predetermined width and a substantially rectangular shape. The invention is especially adapted to provide a circuit for producing pulses having a substantially uniform characteristic regardless of any changes in circuit parameters, such as changes in power supply voltages or in tube characteristics.

An object of the invention is to provide a circuit for producing pulses having a predetermined width.

Another object of the invention is to provide a circuit of the above character for producing pulses having a substantially rectangular shape.

A further object is to provide a circuit of the above character for producing pulses having a substantially uniform characteristic regardless of any changes in circuit parameters.

Still another object is to provide a circuit of the above character which requires a minimum number of parts and which operates efficiently and reliably.

Other objects and advantages of the invention will be apparent from a detailed description and from the appended drawings and claims.

Figure 1:
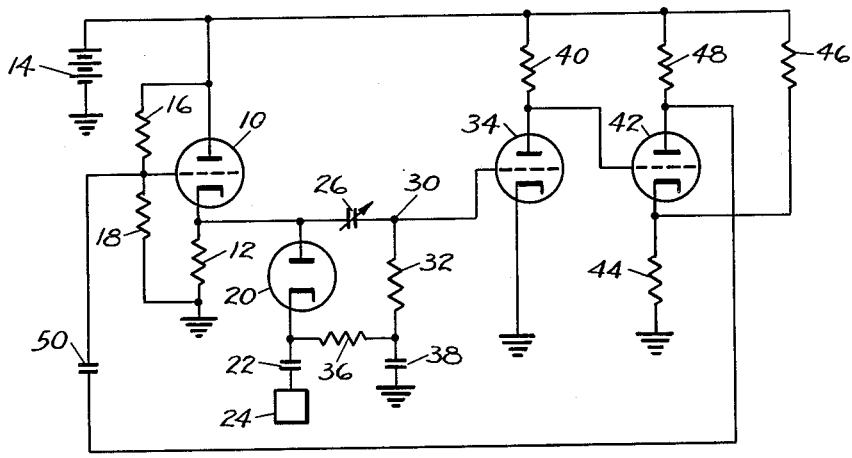
Figure 1 is a circuit diagram of one embodiment of the invention.

In the embodiment of the invention shown in Figure 1, a cathode follower stage having a tube 10 and a cathode resistance 12 is provided. The plate of the tube 10 is connected to the positive terminal of a suitable power supply, such as a battery 14, the negative terminal of which is grounded. The grid of the tube is connected through a suitable resistance 16 to the plate and through a suitable resistance 18 to ground so as to be normally biased at a positive potential, and the cathode is grounded through the resistance 12.

The cathode of the tube 10 is connected to the plate of a diode 20, the cathode of which is connected through a coupling capacitance 22 to a signal source 24 adapted to provide recurrent negative signals. The cathode of the tube 10 is also connected to a variable capacitance 26 which is connected at a terminal 30 to a resistance 32 and to the grid of a tube 34. The resistance 32 and capacitance 26 are chosen to have a predetermined time constant. The resistance 32 is connected through a resistance 36 to the cathode of the diode 28 and through a capacitance 38 to ground. The capacitance 38 has a much larger value than the capacitance 26 and the resistance 32 a much larger value than the resistances 12 and 36.

The cathode of the tube 34 is grounded and the plate is connected through a resistance 40 to the positive terminal of the battery 14. The plate is also connected to the grid of a tube 42, the cathode of which is connected through a resistance 44 to ground and through a resistance 46 to the plate. The plate is connected to one side of a resistance 48, the other side of the resistance being connected to the positive terminal of the battery 14. The output signal on the plate is introduced through a capacitance 50 to the grid of the tube 10 to provide a regenerative action between the tubes 42 and 10.

Since the grid of the tube 10 is positively biased by the resistances 16 and 18, current normally flows through the tube and produces a positive voltage across the resistance 12. Current also flows through a circuit which includes the battery 14, the tube 10, the capacitance 26, and the grid and cathode of the tube 34 and through a circuit which includes the battery, the tube 10, the tube 20, the resistance 36 and the capacitance 38. As a result, the capacitances 26 and 38 become charged to substantially the voltage across the resistance 12 as the circuit approaches the steady state condition.

During the time that current flows through the tube 10, a slightly positive voltage is applied through the capacitance 26 to the grid of the tube 34 as a result of the current which flows between the grid and the cathode of the tube. Since the grid is biased positively, current flows between the plate and cathode of the tube 34, causing the plate voltage to be so depressed that the tube 42 is cut off. The voltage on the battery 14 therefore appears at the plate of the tube 42.

When a negative triggering signal is applied to the cathode of the diode 20 by the source 24, the plate of the diode follows the voltage on the cathode and produces a corresponding voltage drop on the grid of the tube 34. The drop in grid voltage causes the tube 34 to become cut off and its plate voltage to increase. The tube 42 then starts to conduct and produces a negative signal on its plate. Since the grid of the tube 10 is connected to the plate of the tube 42, the negative signal on the plate of the tube 42 causes the tube 10 to become cut off and the voltage on the cathode of the tube to drop to zero. Because of the charge on the capacitance 26, the drop in the voltage across the resistance 12 causes the voltage on the grid of the tube 34 to decrease until the grid voltage reaches a negative value which is substantially equal to the voltage across the capacitance.

When the negative signal is introduced to the tube 20, the voltage on the tube swings below the voltage on the capacitance 38, preventing the capacitance from being further charged. However, since the voltage on the capacitance exceeds the voltage at the terminal 30, the capacitance discharges through a circuit which includes the capacitance 38, the resistance 32, the capacitance 26 and the resistance 12. When the capacitance 26 has discharged sufficiently to return the grid of the tube 34 to a voltage above the cut-off value, the tube starts to conduct. The resultant decrease in plate voltage on the tube 34 causes the tube 42 to become cut off and the voltage on the plate of the tube 42 to increase. The tube 10 then starts to conduct and provides a charging current for the capacitances 26 and 38, as previously explained.

The values of the resistance 32 and capacitance 26 are chosen so that the tube 34 is cut off for a predetermined period of time after the introduction of each negative triggering signal from the source 24. The width of the positive pulse formed on the plate of the tube 34 is substantially constant when the product of the capacitance 26 and resistance 32 remains substantially constant. The pulse width is substantially independent of changes in other parameters, such as changes in the voltage on the battery 14. This may be seen from the fact that with variations in the voltage on the battery 14, corresponding changes are produced in the maximum voltages on the capacitance 38 and on the capacitance 26. As the capacitances discharge, the following relationship exists:

$$V = (|V_c| + |V_g|)(1 - e^{-t/RC})$$

Where $V_c$ is substantially the absolute value of the voltage on the capacitance 38 at the instant that the negative triggering signal is introduced from the source 24;

$V_g$ is substantially the absolute value of the voltage on the grid of the tube 34 at the same instant;

V is substantially the voltage rise at any instant on the grid of the tube 34 after the capacitances 38 and 26 have started to discharge;

$t$ is the time required to produce a voltage rise of V on the grid of the tube 34 after the capacitances have started to discharge;

R is substantially the value of the resistance 32;

C is substantially the value of the capacitance 26.

As previously explained, the capacitances 26 and 38 are both charged to approximately the same voltage during the intervals between negative triggering signals from the source 24, provided that the negative triggering signals are separated by a sufficient time to permit the capacitances to be charged to their maximum voltage. Furthermore, when a negative triggering signal is supplied by the source 24, the voltage on the cathode of the tube 10 drops to approximately zero. Because of the charge on the capacitance 26 and the zero voltage on the cathode of the tube 10, the voltage on the grid of the tube 34 drops to the same voltage below ground as the positive voltage across the capacitance 38. Therefore, $|V_g| = |V_c|$. Since the cut-off voltage of the tube 34 may be considered as being approximately zero, the voltage rise on the grid of the tube 34 during the discharge of the capacitances 26 and 38 may be considered as being approximately $|V_g|$. Thus, $V = |V_g| = |V_c|$. Substituting, $|V_g| = 2|V_g|(1 - e^{-t/RC})$ or $$1 = 2(1 - e^{-t/RC})$$

Therefore, the time required to return the tube 34 to a state of conduction after the introduction of a negative triggering signal is dependent upon substantially the product of the values of the resistance 32 and capacitance 26.

Figure 2:
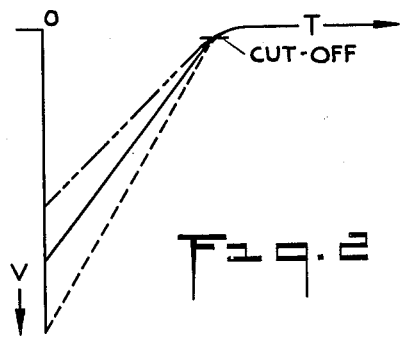
Figure 2 is a curve illustrating the voltage versus time characteristic on the grid of a tube in the circuit shown in Figure 1.

Figure 2 shows the relationship of the voltage on the grid of the tube 34 to time as the capacitances 38 and 26 discharge. The discharge of the capacitances when the battery 14 has a preferred voltage is illustrated in solid line and the discharge of the capacitances when the battery has a voltage above or below the preferred value is illustratd in broken lines. As may be seen, the time required for the grid to reach the cut-off value is substantially independent of the battery voltage.

In addition to having a predetermined width, the negative pulses on the plate of the tube 42 have relatively sharp leading and trailing edges. The sharp leading edge is largely produced by the action of the capacitance 26 in swinging the grid voltage of the tube 34 almost instantaneously from a slightly positive value to a fairly large negative value. The leading edge is further sharpened by the regenerative action which the output pulse on the plate of the tube 42 exerts upon the grid of the tube 10. The output pulse on the plate of the tube 42 has a relatively sharp trailing edge because there is only a small difference between the grid voltage required to cut off the tube 34 and the slightly positive voltage on the grid when the tube is fully conducting. The regenerative action between the tubes 42 and 10 also causes the trailing edge of the output pulse to be sharpened.

When the negative triggering pulses supplied by the source 24 are suitably spaced, output pulses having a predetermined width are produced by the circuit disclosed above.

Figure 3:
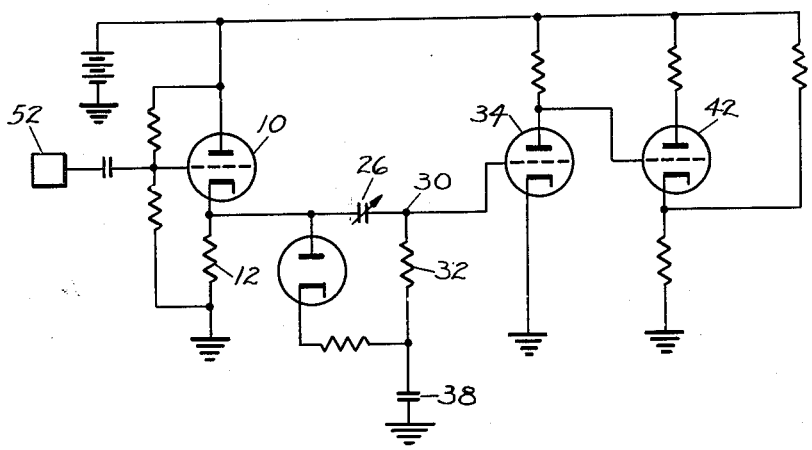
Figure 3 is a circuit diagram of another embodiment of the invention.

The embodiment shown in Figure 3 is similar to the embodiment shown in Figure 1 except that a negative triggering signal is introduced from a source 52 to the grid of the tube 10. Furthermore, in the embodiment shown in Figure 3, no regenerative action is provided between the plate of the tube 42 and the grid of the tube 10.

The negative triggering signal from the source 52 has a longer time duration than the signals produced on the plates of the tubes 34 and 42. Thus, when a negative triggering signal is introduced to the grid of the tube 10, the capacitances 26 and 38 discharge through the resistances 12 and 32 until the voltage on the grid of the tube 34 rises above the cut-off value. The tube 34 then conducts even though a negative voltage still exists on the grid of the tube 10. The resultant positive pulse on the plate of the tube 34 and negative pulse on the plate of the tube 42 have a width which is determined only by the setting of the capacitance 26.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination, a tube, means for normally biasing the tube to provide a current through the tube, a normally charged capacitance connected between the tube and the biasing means to control the bias on the tube, a triggering source connected to the capacitance and to the biasing means and adapted to introduce a negative signal to the biasing means for preventing the operation of the biasing means and to reduce the biasing potential applied by the capacitance to the tube so as to cut off the tube, and means for providing a discharge path for the capacitance upon the introduction of the negative signal so as to return the tube after a predetermined period of time to a condition of conduction.

2. In combination, a tube having a plate, a grid and a cathode, means for normally biasing the grid to provide a current through the tube, a capacitance charged to a positive voltage by the biasing means and connected to the grid of the tube to control the bias on the tube, a triggering source connected to the capacitance and to the biasing means and adapted to introduce a negative signal to the biasing means for preventing its operation and to reduce the biasing potential applied by the capacitance to the tube so as to cut off the tube, and means connected to the capacitance for providing a discharge path for the capacitance upon the introduction of the negative signal so as to maintain the tube in a cut-off condition for a predetermined period of time.

3. In combination, a tube having a cathode, a grid and a plate, means for normally biasing the grid to provide a current through the tube, a capacitance connected to the grid and charged to a positive voltage by the biasing means to maintain the tube normally conductive, a triggering source connected to the capacitance and to the biasing means and adapted to supply a negative signal for cutting off the bias supplied by the biasing means and for reducing the bias applied by the capacitance to the grid of the tube so that the voltage on the grid of the tube is below the cut-off value, and means connected to the capacitance for providing a discharge path for the capacitance upon the introduction of the negative signal, the discharge means being connected to the grid to maintain the grid for a predetermined period of time at a voltage below the cut-off of the tube.

4. In combination, a tube having a cathode, a grid and a plate, means for normally biasing the grid to provide conduction through the tube, a first capacitance connected between the tube, a first capacitance connected between the grid and the biasing means to provide a large negative bias upon the grid upon the introduction of a negative signal to the biasing means, a second capacitance adapted to be charged to a positive voltage during the tube conduction, and a resistance connected to the first and second capacitances to provide a discharge path for the capacitances, the resistance also being connected to the tube grid to bias the tube below cut-off during the discharge of the capacitances.

5. In combination, a capacitance, means connected to the capacitance for normally providing a positive charge on the capacitance, rectifying means connected between the capacitance and the charging means, a tube normally biased by the charging current for conduction, and means connected to the capacitance and the rectifying means for providing a discharge path for the capacitance upon the introduction of a negative signal to the biasing means, the discharge means being connected to the tube to maintain the tube below cut-off during the discharge of the capacitance.

6. In combination, a cathode follower stage having a cathode resistance, a first capacitance connected to the cathode resistance, a rectifier connected to the capacitance and the resistance, a second capacitance connected to the rectifier and adapted to be charged by the cathode follower stage, a normally conducting tube connected to the first capacitance, means for providing a negative triggering signal to cut off the tube, a resistance connected to the first and second capacitances to provide a discharge path for the capacitances upon the introduction of the negative triggering signal to the tube, the resistance being connected to the tube to maintain the tube below cut-off for a predetermined period of time after the commencement of each capacitance discharge.

7. In combination, a cathode follower stage having a cathode resistance, a first capacitance connected to the cathode resistance for charging by the cathode follower stage, a rectifier connected to the capacitance and the resistance, a second capacitance connected to the rectifier for charging by the cathode follower stage, a normally conducting tube having a cathode, a grid and a plate, the grid being connected to the first capacitance, means for introducing a negative signal to the tube to drop the voltage on the grid below cut-off, and a resistance connected to the first and second capacitances to provide a discharge path for the capacitances after the introduction of the negative signal to the tube, the resistance being connected to the grid to maintain the tube below cut-off for a predetermined period of time after the commencement of each capacitance discharge.

8. In combination, a first tube having a cathode, a grid and a plate, means for normally biasing the grid to provide a current through the tube, a capacitance connected to the grid and charged to a positive voltage by the biasing means, means for introducing a negative signal to the grid to cut off the tube, means connected to the capacitance for providing a discharge path for the capacitance upon the introduction of the negative signal, the discharge means being connected to the grid to maintain the grid for a predetermined period of time at a voltage below the cut-off tube, and a second tube having a cathode, a grid and a plate, the plate of the first tube being connected to the grid of the second tube to provide a pulse of predetermined length.

9. In combination, a first tube having a cathode, grid and plate, a resistance connected to the cathode of the tube, means for normally producing a current through the tube, a second tube having a cathode, grid and plate, a capacitance connected between the cathode of the first tube and the grid of the second tube and adapted to be charged by the current through the first tube and to provide a positive voltage on the grid of the second tube during the conduction of the first tube and a negative voltage on the grid of the second tube upon the cut-off of the first tube, means for cutting off the flow of current through the first tube, and a resistance connected to the capacitance to provide a discharge path for the capacitance upon the cut-off of the first tube so as to maintain the second tube cut off for a predetermined period of time.

10. In combination, a first capacitance, a second capacitance, means for charging the capacitances to substantially the same voltage, a tube connected to the first capacitance and biased by the capacitance to produce a flow of current during the charge of the capacitance, means for reducing the voltage on one side of the first capacitance and thereby reducing the voltage on the other side of the capacitance so as to interrupt the charging currents through the capacitances and the current through the tube, and a resistance connected between the first and second capacitances to provide a discharge path for the capacitances for a predetermined period of time before the return of the voltages on the capacitances to a value producing a current through the tube.

11. In combination, a first capacitance, means for charging the capacitance, means for biasing the high voltage side of the capacitance with a positive voltage during the charging of the capacitance, a tube having a cathode, grid and plate, the grid of the tube being connected to the low voltage side of the first capacitance and being provided with a sufficiently positive voltage by the biasing means to produce a current through the tube during the charge of the first capacitance, a second capacitance connected to the charging means to receive a charge producing a positive voltage equal to the voltage produced across the first capacitance by the charging means, triggering means for cutting off the biasing means to reduce the voltage on the high side of the first capacitance to substantially ground potential and the voltage on the grid of the tube to a negative cut-off value, and a resistance connected between the first and second capacitances to provide a discharge path for the capacitances for a predetermined period of time before the return of the voltage on the grid of the tube to a value producing a current through the tube.

12. In combination, a first tube having a cathode, grid and plate, a resistance connected to the cathode of the tube, means for normally producing a current through the tube, a second tube having a cathode, grid and plate, a first capacitance connected between the cathode of the first tube and the grid of the second tube, the capacitance being adapted to be charged by the current through the first tube and to provide a positive voltage on the grid of the second tube during the conduction of the first tube and a negative voltage on the grid of the second tube upon the cut-off of the first tube, a second capacitance adapted to be charged to a positive voltage by the current through the first tube, means for cutting off the flow of current through the first tube, and a resistance connected between the first and second capacitances to provide a discharge path for the capacitances upon the cut-off of the first tube and maintain the second tube cut off for a predetermined period of time.

13. In combination, a first tube having a cathode, grid and plate, a resistance connected to the cathode of the tube, means for normally producing a current through the tube, a second tube having a cathode, grid and plate, a first capacitance connected between the cathode of the first tube and the grid of the second tube, the capacitance being adapted to be charged by the current through the first tube and to provide a positive voltage on the grid of the second tube during the conduction of the first tube and a negative voltage on the grid of the second tube upon the cut-off of the first tube, a second capacitance adapted to be charged to a positive voltage by the current through the first tube, means for cutting off the flow of current through the first tube, a resistance connected between the first and second capacitances to provide a discharge path for the capacitances upon the cut-off of the first tube so as to maintain the second tube cut off for a predetermined period of time, a third tube having its output inversely controlled by the plate voltage on the second tube, and means for feeding the output from the third tube back to the grid of the first tube to maintain the first tube cut off during the cut-off period of the second tube.

14. In combination, a first tube having a cathode, grid and plate, a resistance connected to the cathode of the tube, means for normally producing a current through the tube, a second tube having a cathode, grid and plate, a first capacitance connected between the cathode of the first tube and the grid of the second tube, the capacitance being adapted to be charged by the current through the first tube and to provide a positive voltage on the grid of the second tube during the conduction of the first tube and a negative voltage on the grid of the second tube upon the cut-off of the first tube, a second capacitance adapted to be charged to a positive voltage by the current through the first tube, a resistance connected between the first and second capacitances to provide a discharge path for the capacitances upon the cut-off of the first tube so as to maintain the second tube cut off for a predetermined period of time, and means connected to the grid of the first tube for cutting off the flow of current through the tube for a period of time greater than the predetermined period.

MAURICE W. HORRELL.

REFERENCES CITED

The following references are of record in the file of this patent:

UNITED STATES PATENTS

| Number | Name | Date |
| --- | --- | --- |
| 2,405,237 | Ruhlig | Aug. 6, 1946 |
| 2,442,769 | Kenyon | June 8, 1948 |
| 2,562,660 | Chance | July 31, 1951 |